(12) United States Patent
Sun et al.

(10) Patent No.: US 10,708,955 B2
(45) Date of Patent: Jul. 7, 2020

(54) TECHNIQUES AND APPARATUSES FOR SUPPLEMENTARY UPLINK RANDOM ACCESS CONFIGURATION

(71) Applicant: QUALCOMM Incorporated, San Diego, CA (US)

(72) Inventors: Haitong Sun, Cupertino, CA (US); Heechoon Lee, San Diego, CA (US); Peter Gaal, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 16/013,633

(22) Filed: Jun. 20, 2018

(65) Prior Publication Data
US 2018/0376510 A1    Dec. 27, 2018

Related U.S. Application Data

(60) Provisional application No. 62/524,159, filed on Jun. 23, 2017.

(51) Int. Cl.
*H04W 74/08* (2009.01)
*H04W 72/04* (2009.01)
(Continued)

(52) U.S. Cl.
CPC ..... *H04W 74/0833* (2013.01); *H04W 28/085* (2013.01); *H04W 72/042* (2013.01);
(Continued)

(58) Field of Classification Search
CPC ........... H04W 74/0833; H04W 74/006; H04W 72/0486; H04W 72/042; H04W 28/085; H04W 48/12
See application file for complete search history.

(56) References Cited

U.S. PATENT DOCUMENTS

| 2010/0278131 | A1* | 11/2010 | Jeong | H04W 74/0833 370/329 |
| 2014/0086127 | A1* | 3/2014 | Kim | H04L 5/001 370/311 |
| 2017/0055188 | A1* | 2/2017 | Johansson | H04W 72/10 |

OTHER PUBLICATIONS

CATT: "Report of Email Discussion [95bis#25] [LTE/NB-IoT] RACH on Non-Anchor", 3GPP Draft; R2-168156, 3rd Generation Partnership Project (3GPP), Mobile Competence Centre, 650, Route Des Lucioles; F-06921 Sophia-A, vol. RAN WG2, No. Reno, USA; Nov. 13, 2016 (Nov. 13, 2016), XP051177848, Retrieved from the Internet: URL:http://www.3gpp.org/ftp/Meetings_3GPP_SYNC/RAN2/Docs/, 30 pages.
(Continued)

*Primary Examiner* — Jianye Wu
(74) *Attorney, Agent, or Firm* — Harrity & Harrity, LLP \ Qualcomm

(57) ABSTRACT

Certain aspects of the present disclosure generally relate to wireless communication. In some aspects, a user equipment may receive RACH configuration information on a downlink carrier of a first set of carriers, wherein the RACH configuration information pertains to the first set of carriers and to a second set of carriers; and selectively perform a RACH procedure with regard to the first set of carriers or the second set of carriers based at least in part on the RACH configuration information. Numerous other aspects are provided.

40 Claims, 13 Drawing Sheets

(51) Int. Cl.
*H04W 74/00* (2009.01)
*H04W 28/08* (2009.01)
*H04W 48/12* (2009.01)

(52) U.S. Cl.
CPC ..... *H04W 72/0486* (2013.01); *H04W 74/006* (2013.01); *H04W 48/12* (2013.01)

(56) References Cited

OTHER PUBLICATIONS

Huawei et al., "Overview of NR UL for LTE-NR Coexistence", 3GPP Draft; R1-1709979, 3rd Generation Partnership Project (3GPP), Mobile Competence Centre ; 650, Route Des Lucioles ; F-06921 Sophia-Antipolis Cedex; France, vol. RAN WG1, No. Qingdao, China, Jun. 17, 2017 (Jun. 17, 2017), XP051304719, Retrieved from the Internet:URL:http://www.3gpp.org/ftp/tsg_ran/WG1_RL1/TSGR1_AH/NR_AH_1706/Docs/, 12 pages.
International Search Report and Written Opinion—PCT/US2018/038735—ISA/EPO—dated Sep. 13, 2018.
LG Electronics: "Remaining Details on UL Sharing Between LTE and NR", 3GPP Draft; R1-1710354, 3rd Generation Partnership Project (3GPP), Mobile Competence Centre; 650, Route Des Lucioles, F-06921, Sophia-Antipolis Cedex, France, vol. RAN WG1, No. Qingdao, P.R. China, Jun. 17, 2017, XP051304975, Retrieved from the Internet: URL:http://www.3gpp.org/ftp/tsg_ran/WG1_RL1/TSGR1 AH/NR AH 1706/Docs/, 6 pages.
Huawei et al., "NPRACH on Non-anchor NB-IoT Carrier", 3GPP Draft; R2-167816, 3rd Generation Partnership Project (3GPP), Mobile Competence Centre; 650, Route Des Lucioles; F-06921 Sophia-Antipolis Cedex; France, vol. RAN WG2, no. Reno, Nevada, USA; Nov. 13, 2016 (Nov. 13, 2016), XP051177581, Retrieved from the Internet: URL:http://www.3gpp.org/ftp/Meetings_3GPP_SYNC/RAN2/Docs/, 8 pages.

* cited by examiner

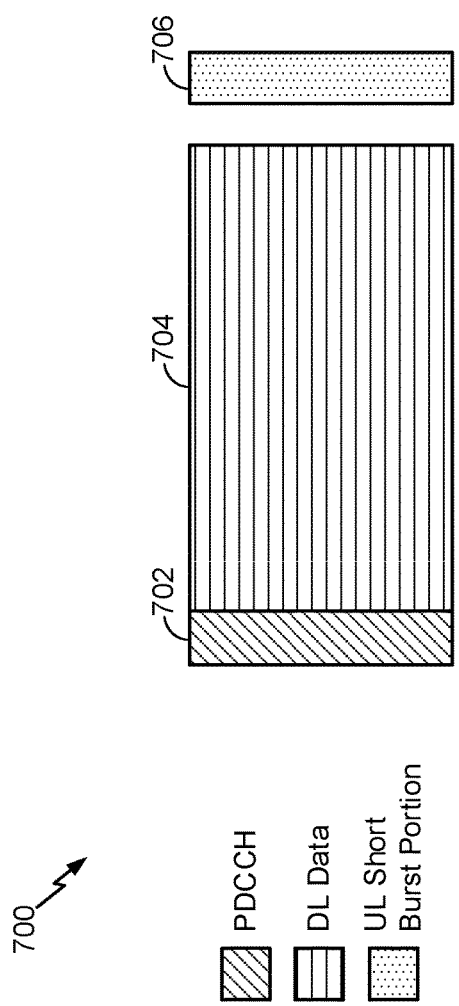
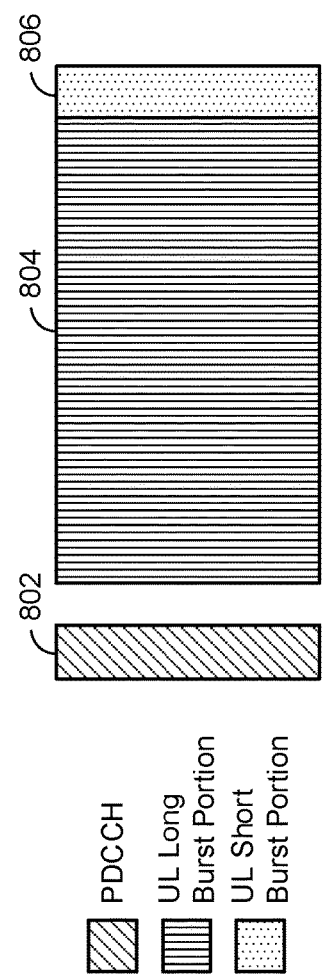
FIG. 7
FIG. 8

TECHNIQUES AND APPARATUSES FOR SUPPLEMENTARY UPLINK RANDOM ACCESS CONFIGURATION

CROSS-REFERENCE TO RELATED APPLICATIONS UNDER 35 U.S.C. § 119

This application claims priority to Provisional Patent Application No. 62/524,159, filed on Jun. 23, 2017, entitled "TECHNIQUES AND APPARATUSES FOR SUPPLEMENTAL UPLINK RANDOM ACCESS CONFIGURATION," which is hereby expressly incorporated by reference herein.

FIELD OF THE DISCLOSURE

Aspects of the present disclosure generally relate to wireless communication, and more particularly to techniques and apparatuses for supplementary uplink random access configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include receiving random access channel (RACH) configuration information on a downlink carrier of a first set of carriers, wherein the RACH configuration information pertains to the first set of carriers and to a second set of carriers; and selectively performing a RACH procedure with regard to the first set of carriers or the second set of carriers based at least in part on the RACH configuration information.

In some aspects, a user equipment for wireless communication may include a memory and one or more processors configured to receive RACH configuration information on a downlink carrier of a first set of carriers, wherein the RACH configuration information pertains to the first set of carriers and to a second set of carriers; and selectively perform a RACH procedure with regard to the first set of carriers or the second set of carriers based at least in part on the RACH configuration information.

In some aspects, a non-transitory computer-readable medium may store one or more instructions for wireless communication. The one or more instructions, when executed by one or more processors of a user equipment, may cause the one or more processors to receive RACH configuration information on a downlink carrier of a first set of carriers, wherein the RACH configuration information pertains to the first set of carriers and to a second set of carriers; and selectively perform a RACH procedure with regard to the first set of carriers or the second set of carriers based at least in part on the RACH configuration information.

In some aspects, an apparatus for wireless communication may include means for receiving RACH configuration information on a downlink carrier of a first set of carriers, wherein the RACH configuration information pertains to the first set of carriers and to a second set of carriers; and means for selectively performing a RACH procedure with regard to the first set of carriers or the second set of carriers based at least in part on the RACH configuration information.

Aspects generally include a method, apparatus, system, computer program product, non-transitory computer-readable medium, user equipment, wireless communication device, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with certain aspects of the present disclosure.

FIG. 8 is a diagram illustrating an example of an uplink (UL)-centric subframe, in accordance with certain aspects of the present disclosure.

DETAILED DESCRIPTION

Figure 1:
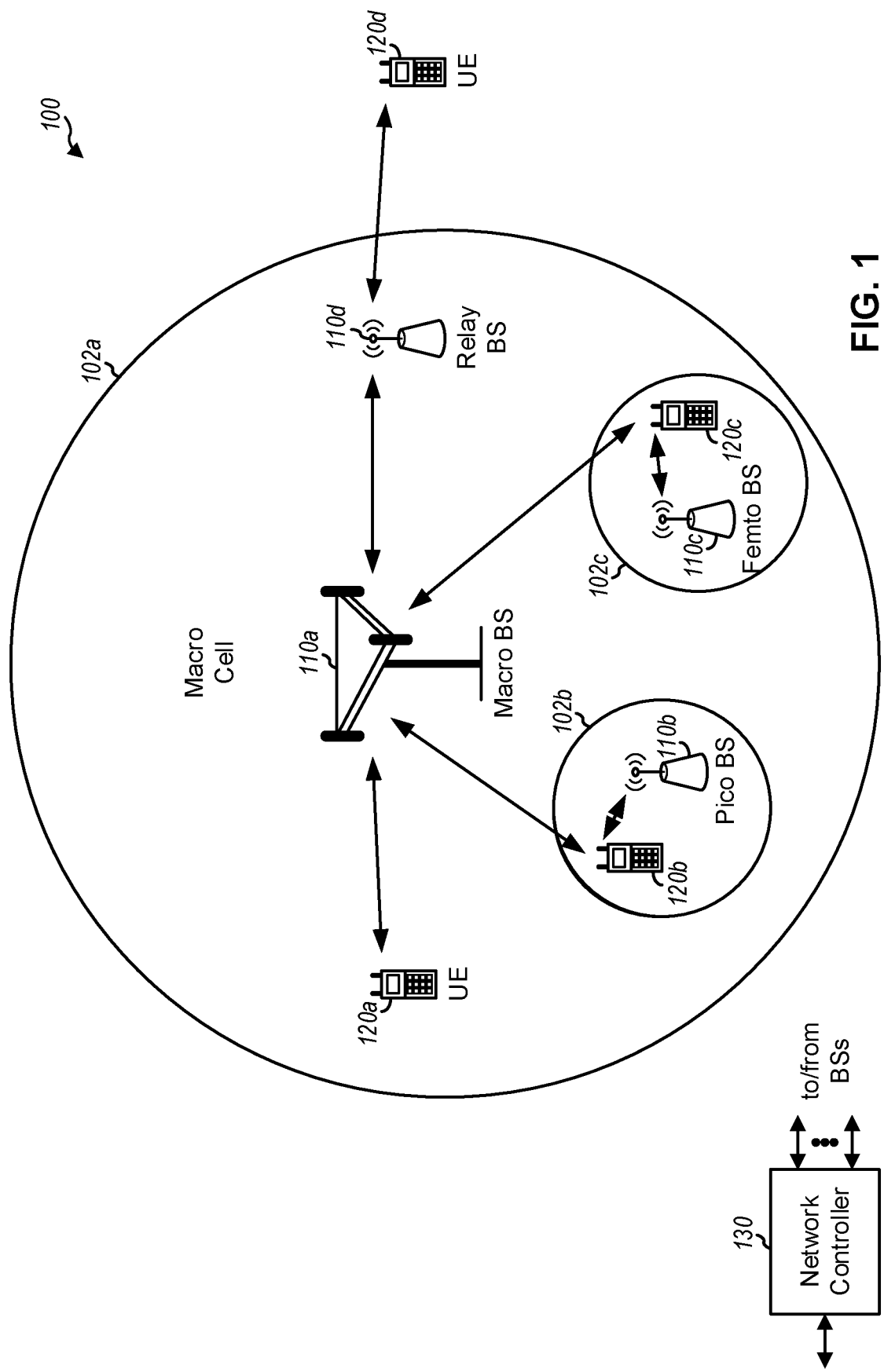
FIG. 1 is a block diagram conceptually illustrating an example of a wireless communication network, in accordance with certain aspects of the present disclosure.

A UE may perform a RACH procedure to synchronize with a BS in an uplink direction. For example, the UE may transmit a first message (e.g., a random access preamble) on the uplink that includes a preamble identifier and a random access radio network temporary identifier (RA-RNTI). The UE may listen for a second message from the BS (e.g., a random access response or RAR) that identifies a grant of resources reserved for the UE, along with a timing advance, the preamble identifier, transmit power control (TPC) information, and a temporary cell RNTI (T-C-RNTI or TC-RNTI) requesting for the UE to transmit a radio resource control (RRC) connection request. After receiving the second message, the UE may transmit the RRC connection request on the resources as a third message, and may receive, from the BS, a permanent identifier (e.g., a C-RNTI). Thus, synchronization is performed and an RRC connection is established in the uplink direction. Synchronization may be performed in the downlink direction (e.g., synchronization of the UE with the network) using the PSS and SSS transmitted by the BS before the RACH procedure is performed.

A UE, such as a UE using a NR radio access technology (RAT), may use a supplementary uplink (SUL) configuration. In a SUL configuration, the UE may connect to a primary uplink carrier at a first frequency band, and may connect to a supplementary uplink carrier at a second frequency band different from the first frequency band. In some aspects, the first frequency band may be a time division duplexing (TDD) frequency band or a frequency division duplexing (FDD) frequency band. In some aspects, the second frequency band may be a TDD frequency band, may be an FDD frequency band, or may be an uplink-only frequency band. Additionally, or alternatively, the first frequency band and/or the second frequency band may be associated with respective downlink carriers. The primary uplink carrier and the downlink carrier of the first frequency band may be termed a first set of carriers, and the supplementary uplink carrier and the downlink carrier (when present) of the second frequency band may be termed a second set of carriers.

One advantage of using SUL is that the second set of carriers, of the second frequency band, may have better coupling loss than the first set of carriers due to a lower path loss and a smaller penetration loss. This may provide improved range and uplink performance on the second frequency band. Also, the second frequency band may be narrower than the first frequency band, so for a UE with a limited bandwidth requirement (e.g., based at least in part on link budget or packet size), it may be more spectrally efficient to use the second frequency band.

However, SUL may lead to certain difficulties for RACH configuration of the UE 120. For example, the first set of carriers and the second set of carriers may have different uplink coverage due to a difference in coupling loss between the first set of carriers and the second set of carriers. Furthermore, the supplementary uplink carrier may have less accurate RACH open loop power control than the primary uplink carrier. For example, the supplementary uplink carrier may not have a paired downlink carrier, or, if the supplementary uplink carrier has a paired downlink carrier, the UE 120 may not measure or connect to the paired downlink carrier. Therefore, it may be difficult to provide RACH configuration information for the second set of carriers and, thus, it may be difficult to perform RACH configuration of the second set of carriers.

Techniques and apparatuses described herein may provide RACH configuration information for the second set of carriers on a downlink carrier of the first set of carriers, and may selectively perform a RACH procedure with regard to the first set of carriers or the second set of carriers, wherein the RACH procedure is performed using the RACH configuration information. For example, when the UE is capable of using the second set of carriers as a supplementary uplink carrier, the UE may transmit uplink RACH messages (e.g., the first and third messages) using the second set of carriers. In some aspects, the UE may interpret the RACH configuration information and/or a second message of the RACH procedure differently for the supplementary uplink carrier than for the primary uplink carrier, which improves performance of the RACH procedure on the supplementary uplink carrier and mitigates inaccuracy in the RACH procedure caused by the difference in coupling loss between the primary uplink carrier and the supplementary uplink carrier. Thus, RACH performance is improved and RACH configuration of the UE using the supplementary uplink carrier is enabled.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. UEs may synchronize with a base station in the downlink direction based at least in part on synchronization signals transmitted by the base station, and may perform a random access procedure to synchronize with the base station in the uplink direction.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
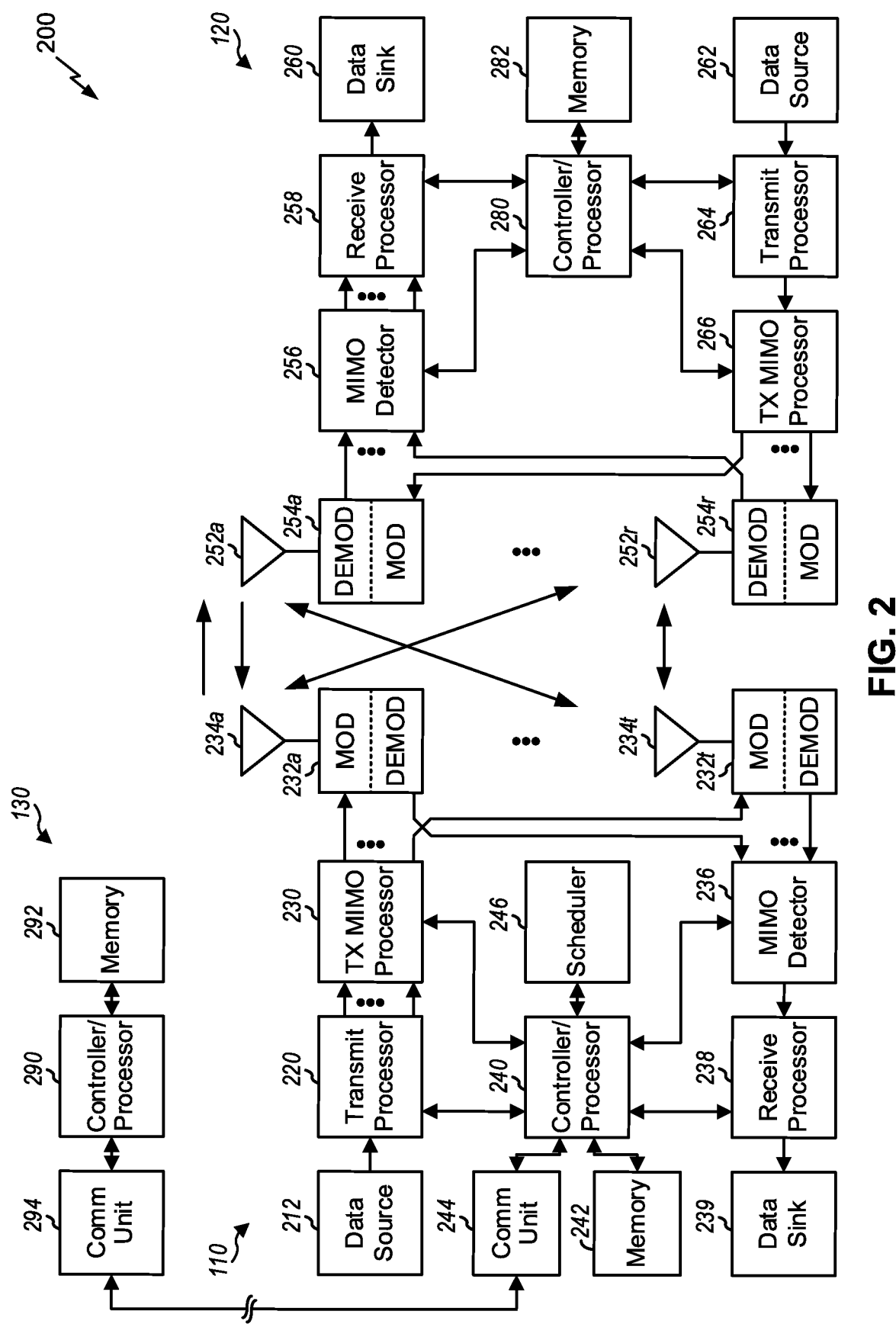
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. In some aspects, the UE 120 may transmit a random access preamble to the base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. In some aspects, base station 110 may provide a random access response based at least in part on a random access preamble received from the UE 120. The random access response may identify characteristics of a radio resource control connection setup message and/or the like. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform supplementary uplink random access configuration. For example, controller/processor 280 and/or other processors and modules at UE 120, may perform or direct operations of UE 120 to perform supplementary uplink random access configuration. For example, controller/processor 280 and/or other controllers/processors and modules at UE 120 may perform or direct operations of, for example, process 1000 of FIG. 10 and/or other processes as described herein. In some aspects, one or more of the components shown in FIG. 2 may be employed to perform example process 1000 and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving random access channel (RACH) configuration information on a downlink carrier of a first set of carriers, means for selectively performing a RACH procedure with regard to the first set of carriers or the second set of carriers based at least in part on the RACH configuration information, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
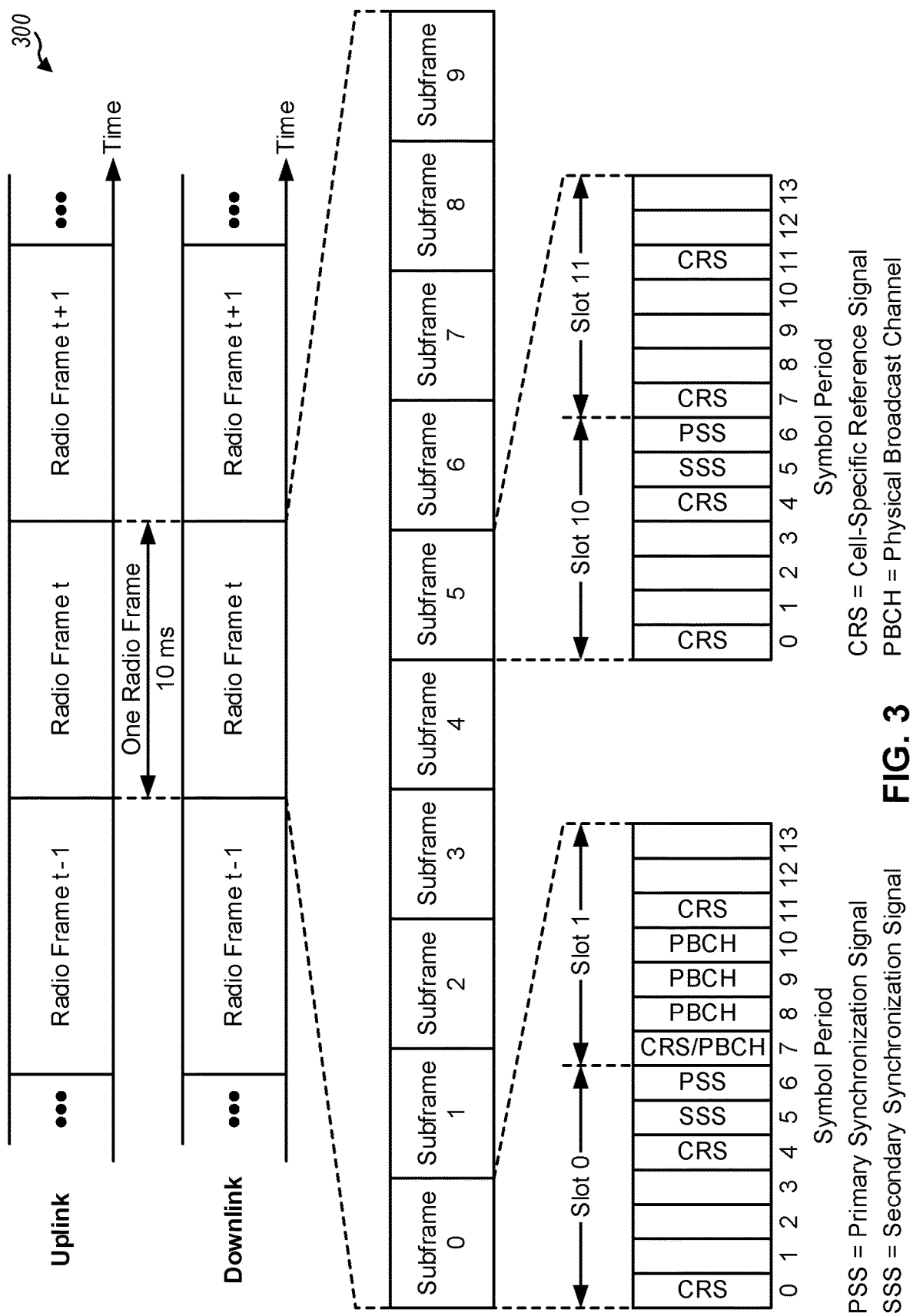
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
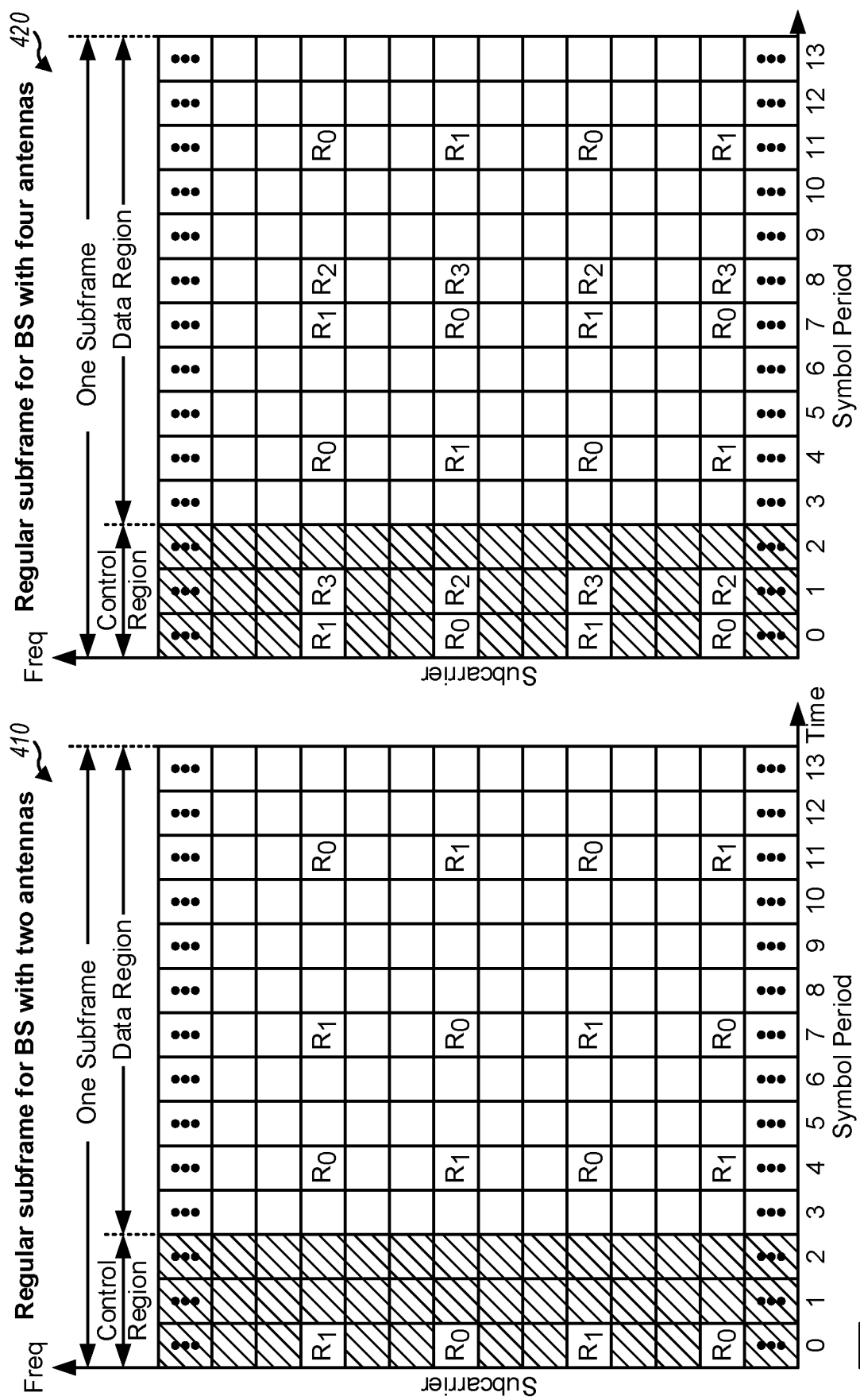
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
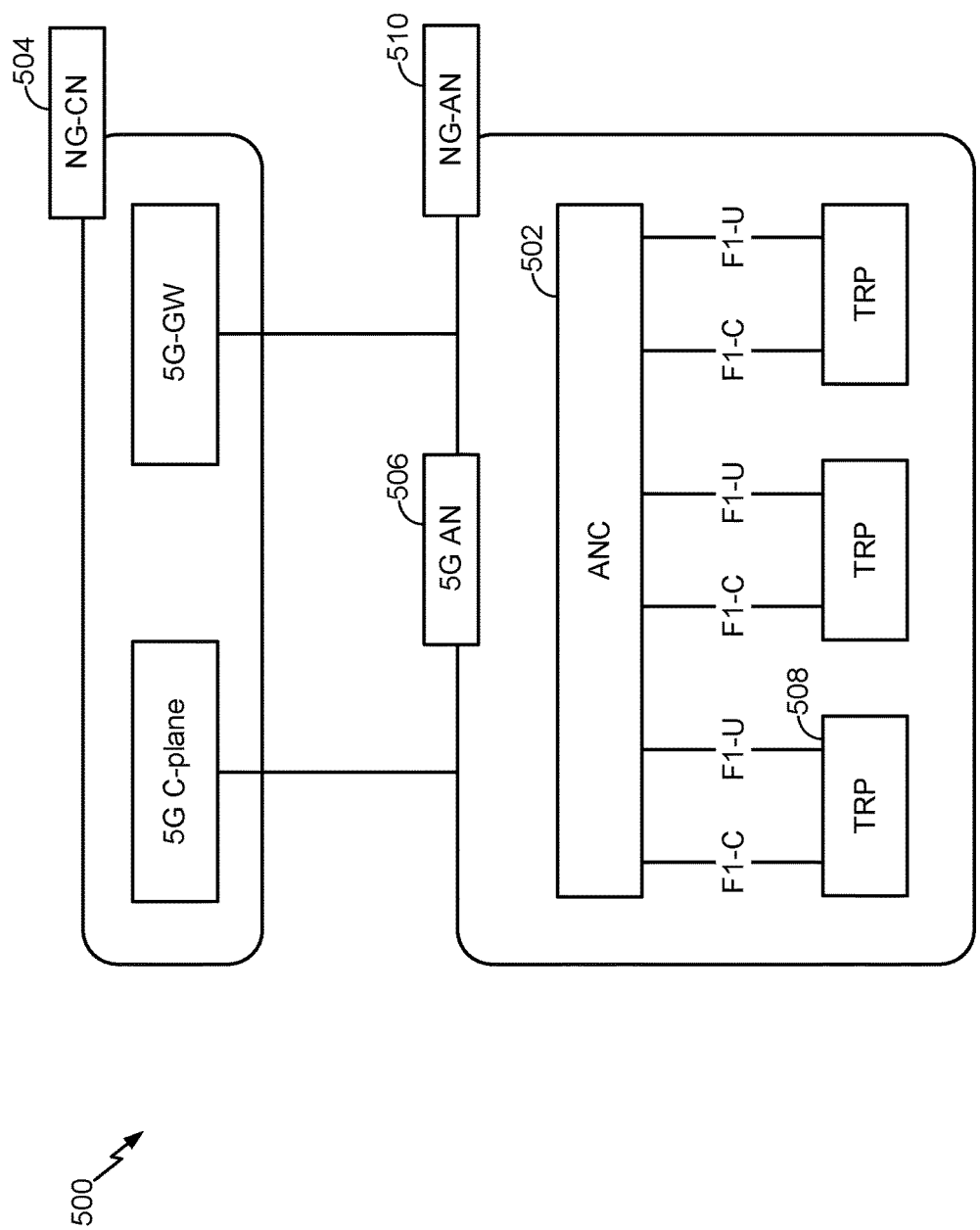
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
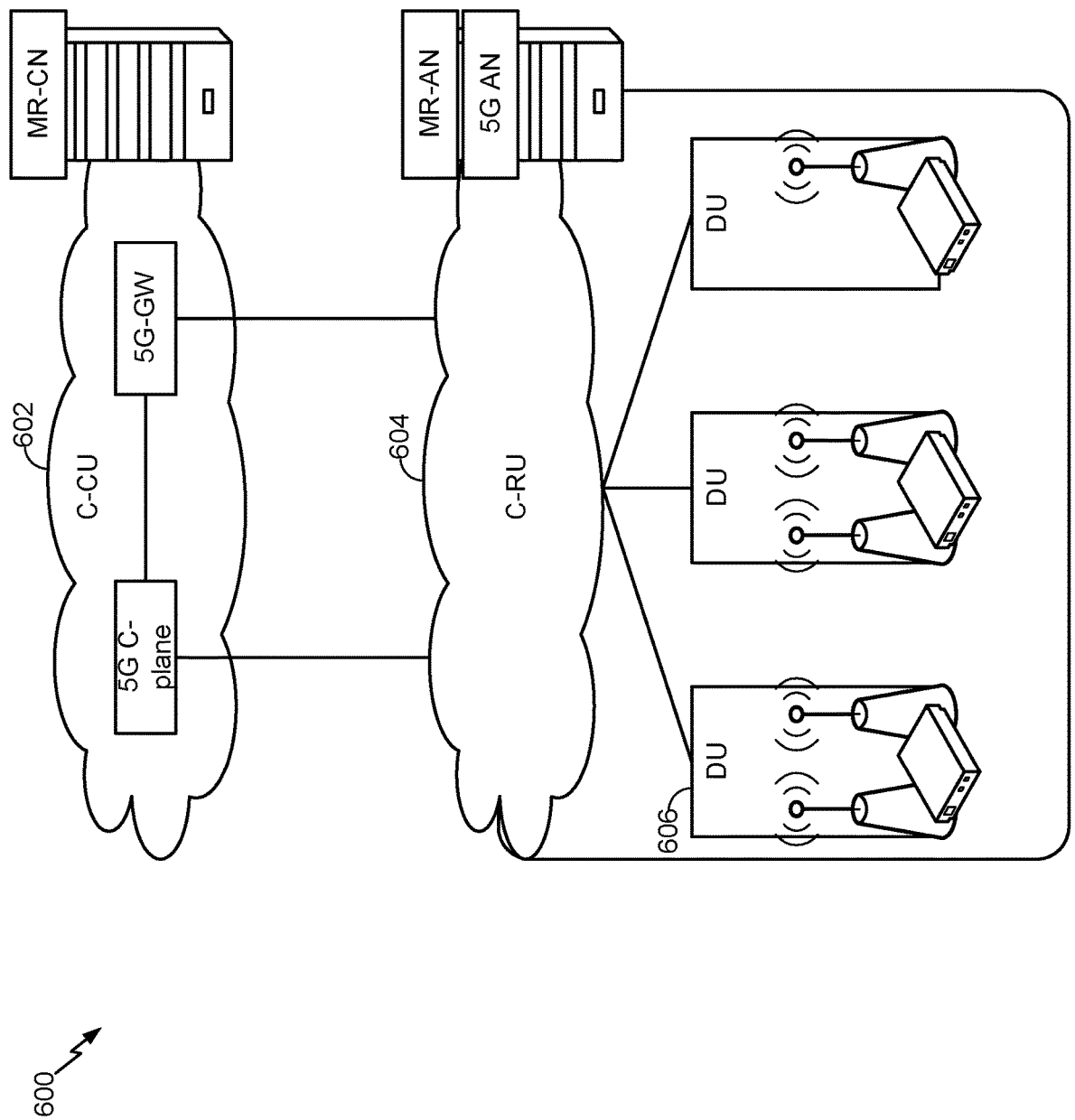
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion may include RACH configuration information for a UE 120. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include a random access preamble or the like. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an acknowledgment (ACK) signal (e.g., a physical uplink control channel (PUCCH) ACK, a physical uplink shared channel (PUSCH) ACK, an immediate ACK), a non-acknowledgment (NACK) signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

FIGS. 9A-9E are diagrams illustrating examples 900 of supplementary uplink random access configuration, in accordance with various aspects of the present disclosure.

Figure 9A:
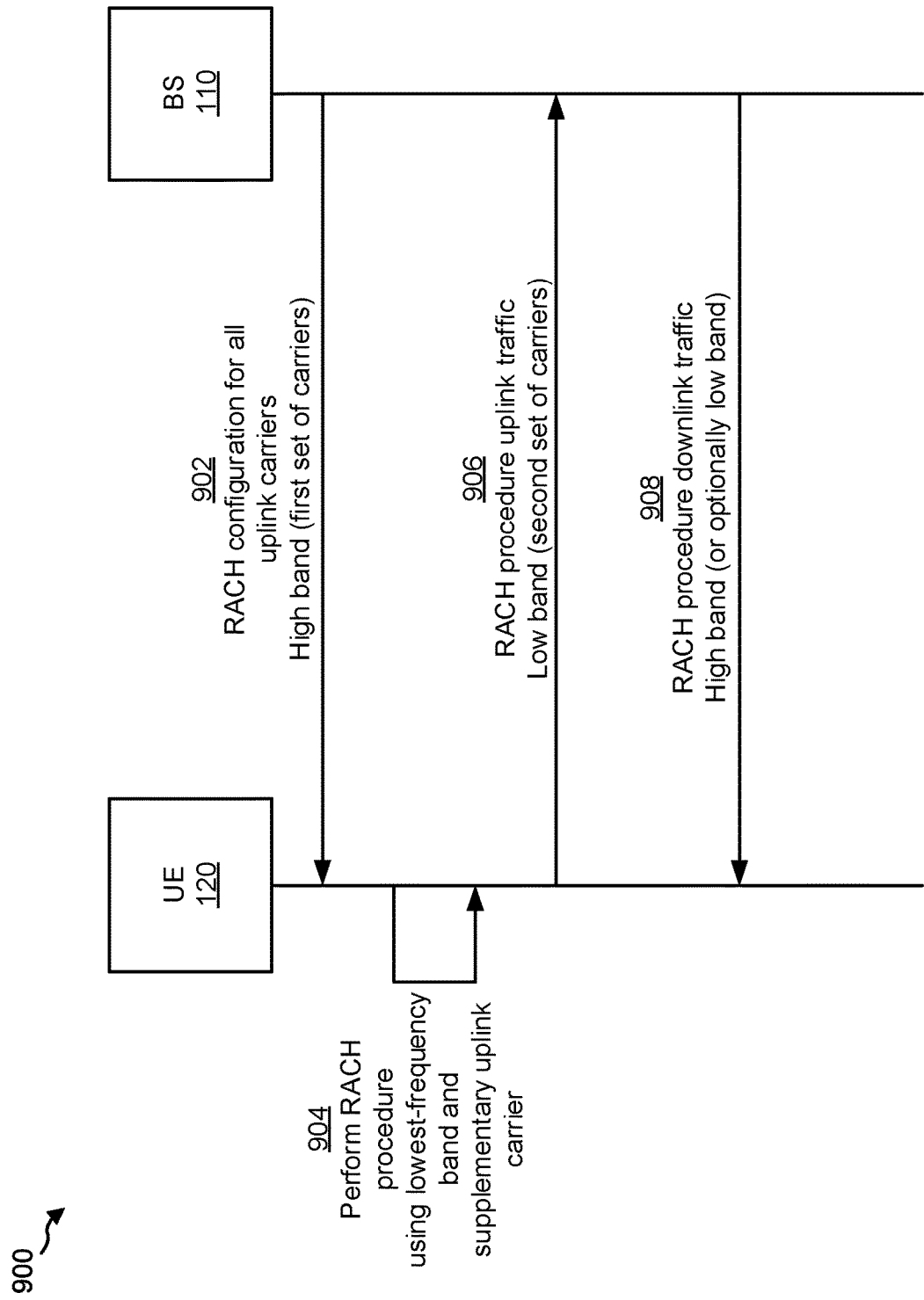
FIGS. 9A-9E are diagrams illustrating examples of supplementary uplink random access configuration, in accordance with various aspects of the present disclosure.

FIG. 9A shows an example of configuring a RACH procedure for a supplementary uplink carrier using RACH configuration information provided on a different set of carriers than one including the supplementary uplink carrier. As shown in FIG. 9A, and by reference number 902, a BS 110 may provide RACH configuration information to a UE 120 on a downlink carrier of a high band (i.e., a higher frequency band than a low band). For example, the downlink carrier may be included in a first set of carriers in the high band. As further shown, the RACH configuration information may include configuration information for all uplink carriers of the UE 120. For example, the RACH configuration information may pertain to the first set of carriers and to a second set of carriers on the low band (e.g., a lower frequency band than the high band) that includes a supplementary uplink carrier of the UE 120. In some aspects, the RACH configuration information may include, for example, a threshold (e.g., an RSRP threshold and/or the like) for selection of a synchronization signal block for the first set of carriers, a threshold for selection of a synchronization signal block for the second set of carriers, a starting index of a random access preamble group for the first set of carriers and/or the second set of carriers, a number of random access preambles for the first set of carriers and/or the second set of carriers, a configured UE transmitted power of the supplementary uplink carrier, a configured UE transmitted power of the downlink carrier and/or a serving cell of the high band (e.g., the cell performing the random access procedure), and/or the like.

As shown by reference number 904, the UE 120 may determine to perform a RACH procedure using the supplementary uplink carrier associated with a lowest-frequency band. For example, the UE 120 may determine to perform the RACH procedure using the RACH configuration information for a lowest frequency band supported by the UE 120. As another example, when the UE 120 only supports a first set of carriers, the UE 120 may perform the RACH procedure using the first set of carriers and using the RACH configuration information for the first set of carriers. When the UE 120 supports the first set of carriers and the second set of carriers, the UE 120 may perform the RACH procedure using a set of carriers associated with a lowest frequency band, of the first set of carriers and the second set of carriers, and may use corresponding RACH configuration information of the set of carriers associated with the lowest frequency band. In some aspects, performing the RACH procedure may include selecting a carrier, of the first set of carriers and the second set of carriers, and setting a transmission power to a configured UE transmitted power for the selected carrier.

As shown by reference number 906, the UE 120 may transmit RACH procedure uplink traffic (e.g., the first message and/or the third message of the RACH procedure) using the second set of carriers (e.g., the supplementary uplink carrier). In this way, the UE 120 may perform the RACH procedure using the second set of carriers, which improves uplink performance of the RACH procedure and which improves versatility of the UE 120.

As shown by reference number 908, in some aspects, the UE 120 may receive RACH procedure downlink traffic (e.g., the second message and/or the fourth message of the RACH procedure) using the first set of carriers (e.g., the downlink carrier used to provide the RACH configuration information). As further shown, the UE 120 may optionally receive the RACH procedure downlink traffic using the second set of carriers (e.g., a paired downlink carrier of the supplementary uplink carrier). For example, when the supplementary uplink carrier is associated with a paired downlink carrier, the BS 110 may provide the RACH procedure downlink traffic on the paired downlink carrier, thereby conserving resources of the downlink carrier of the first set of carriers. In some aspects, the UE 120 may modify or interpret the second message differently based at least in part on whether the second message is received using the first set of carriers or the second set of carriers, as described in more detail below. In some aspects, the UE 120 may modify or interpret the second message differently based at least in part on whether the second message is received using the primary uplink or the supplementary uplink, as described in more detail elsewhere herein.

In some aspects, the UE 120 may determine whether the RACH procedure is to be performed using the first set of carriers or the second set of carriers based at least in part on a threshold. For example, the BS 110 (or the UE 120) may configure a threshold, and the UE 120 may selectively perform the RACH procedure using the first set of carriers, or the second set of carriers, based at least in part on whether threshold is satisfied. In some aspects, the threshold may be configured to improve load balancing of the first set of carriers and the second set of carriers. For example, the threshold may be based at least in part on a function (e.g., a hash function) of a UE identifier of the UE 120 (e.g., UEs 120 with an odd last digit may use the first set of carriers, and UEs 120 with an even last digit may use the second set of carriers).

In some aspects, the BS 110 may be capable of overriding the threshold. For example, the UE 120 may receive a flag, a value, and/or the like from the BS 110 indicating that the threshold is to be overridden. In such a case, the UE 120 may perform the RACH procedure using a particular set of carriers, of the first set of carriers and the second set of carriers, irrespective of a value associated with the threshold. For example, the particular set of carriers may be based at least in part on a predefined setting of the UE 120, information specified by the flag or value received from the BS 110, a set of carriers associated with a lowest frequency, and/or the like.

Figure 9B:
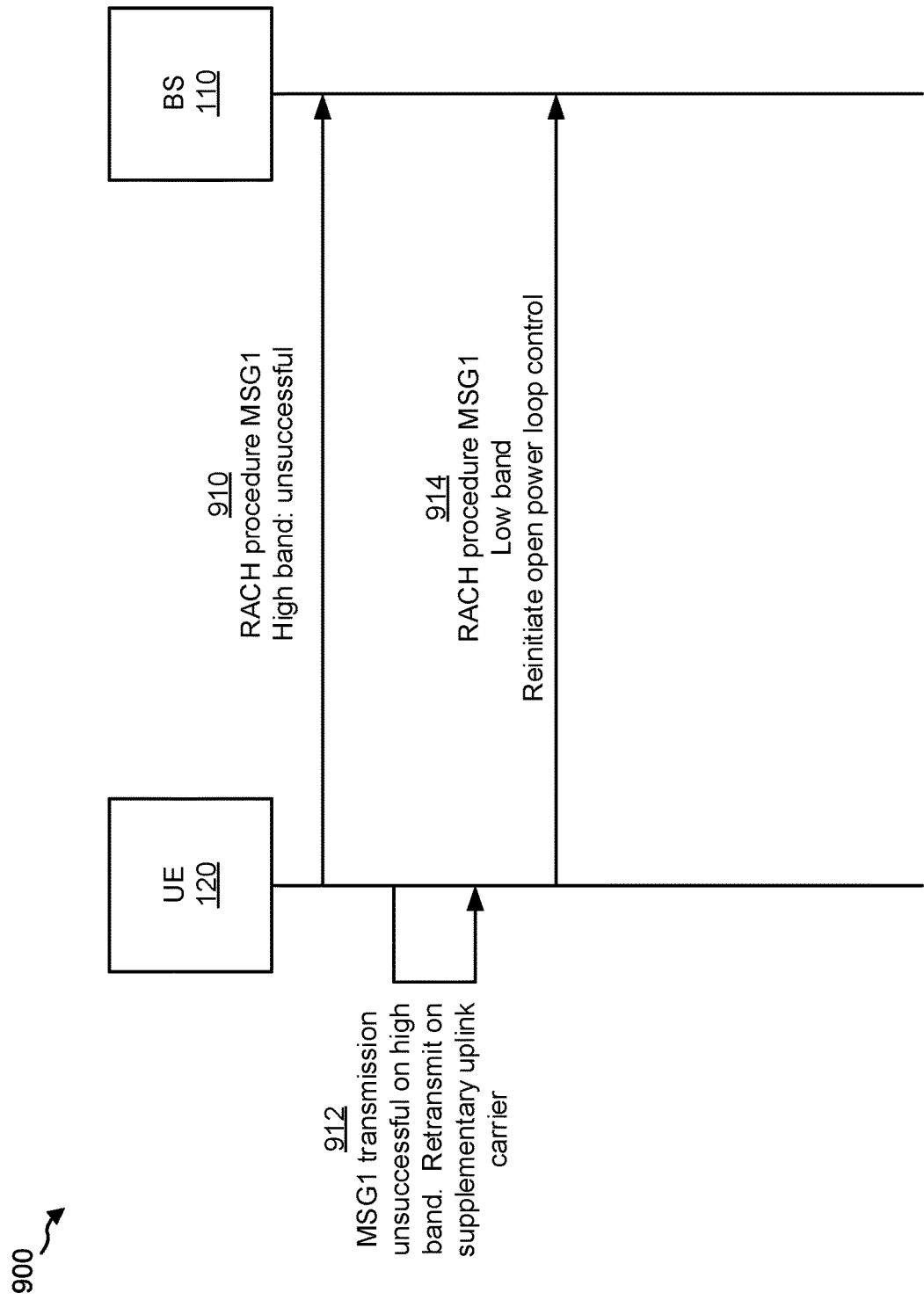

FIG. 9B shows an example of falling back to a supplementary uplink carrier for transmission of a random access preamble. As shown in FIG. 9B, and by reference number 910, in some aspects, the UE 120 may attempt to transmit a first message (e.g., a random access preamble, shown as MSG1) of the RACH procedure on the high band (e.g., the primary uplink carrier associated with the first set of carriers), and may be unsuccessful. For example, the high band may be more crowded than the low band, or the UE 120 may experience more severe coupling loss at the high band than at the low band.

As shown by reference number 912, the UE 120 may determine that transmission of the first message was unsuccessful on the primary uplink carrier and/or the high band. In some aspects, the UE 120 may determine that the transmission of the first message was unsuccessful a particular number of times (e.g., three times, five times, and/or the like). As further shown, the UE 120 may determine that the first message is to be retransmitted on the supplementary uplink carrier (e.g., the carrier associated with the low band).

As shown by reference number 914, the UE 120 may transmit the first message on the low band using the supplementary uplink carrier. In this way, the UE 120 may fall back to a supplementary uplink carrier for the RACH procedure when performance of the RACH procedure on the primary uplink carrier is unsuccessful.

As further shown, in some aspects, the UE 120 may reinitiate open loop power control for the first message on the low band. For example, the UE 120 may start transmission of the first message at a first power level, and may incrementally increase the power level when the transmission is unsuccessful, which may improve battery performance of the UE 120. Additionally, or alternatively, the UE 120 may reuse the power level used to transmit the first message on the primary uplink carrier, which may conserve resources of the UE 120 that would be used to perform open loop power control, and which may improve the likelihood of successful transmission of the first message.

Figure 9C:
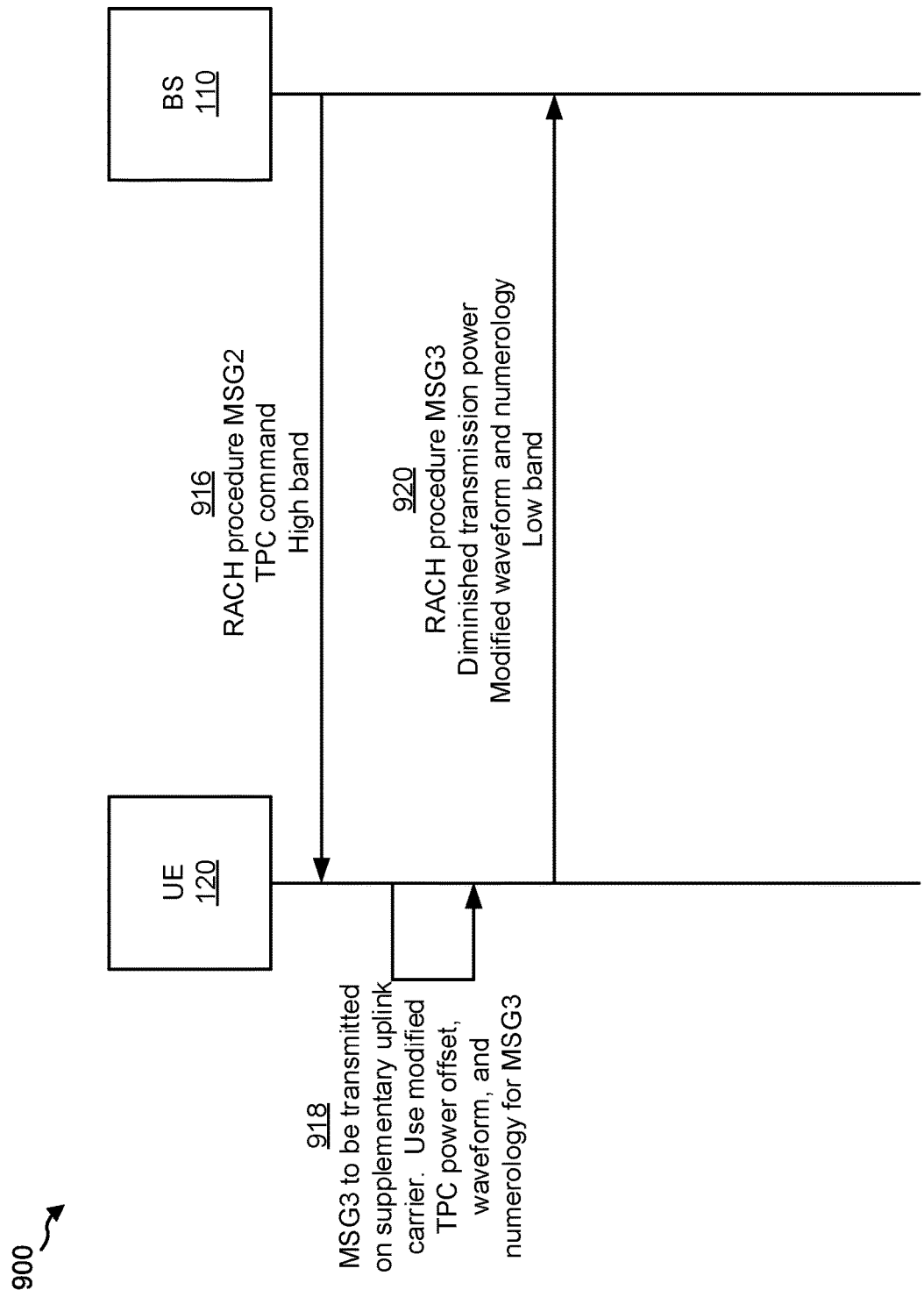

FIG. 9C shows an example of interpreting a random access response and/or a TPC command based at least in part on a configuration to transmit a particular message (e.g., an RRC connection setup message) on a supplementary uplink carrier. As shown in FIG. 9C, and by reference number 916, the BS 110 may transmit a second message (e.g., shown as MSG2) to the UE 120 on the downlink carrier associated with the first set of carriers as part of the RACH procedure. In some aspects, the second message may include a random access response, and/or the like. As further shown, the second message may include a TPC command. The TPC command may identify a power back-off for transmission of a third message by the UE 120. However, the power level used for transmission on the primary uplink carrier may be different than the power level used for transmission on the supplementary uplink carrier due to differences in coupling loss, channel characteristics, and/or the like. Furthermore, it may be beneficial to use different waveforms (e.g., DFT-spread waveforms versus CP-OFDM waveforms) for the supplementary uplink carrier and the primary uplink carrier. Still further, it may be beneficial to use a different numerology (e.g., subcarrier spacing, etc.) for the supplementary uplink carrier and the primary uplink carrier. In some aspects, the second message may identify a waveform and/or numerology for transmission of the third message.

As shown by reference number 918, the UE 120 may determine that the third message is to be transmitted on the supplementary uplink carrier associated with the second set of carriers. Therefore, the UE 120 may interpret the second message differently than if the third message is to be transmitted on the primary uplink carrier. For example, the UE 120 may determine to use at least one of a modified TPC power offset (e.g., a modified power level or power back-off), a modified waveform, and/or a modified numerology to transmit the third message on the supplementary uplink carrier in comparison to transmitting the third message on the primary uplink carrier. For example, the UE 120 may use a lower power level (e.g., a higher TPC power offset or power back-off), may use a simpler waveform (e.g., a CP-OFDM waveform), and/or may use a tighter subcarrier spacing for the transmission of the third message using the supplementary uplink carrier in comparison to transmitting the third message on the primary uplink carrier.

In some instances as used herein, the term "interpret" may include performing, by the UE 120 for example, a determination or reading of information based on at least one factor in addition to the content of a message. In the present example, the UE 120 may receive a second message whose contents include parameters to be used by the UE 120 for transmission of a subsequent third message. The parameters, as determined by the UE 120, however, may differ depending on whether the third message is to be transmitted on a primary uplink carrier or on a supplementary uplink carrier, although the content of the second message as received by the UE 120 remains the same. For example, the UE 120 may determine that the contents of the second message indicate a first set of parameters for transmission of the third message if the UE 120 is configured to transmit the third message on a primary uplink carrier, while the UE 120 may determine that the contents of the second message indicate a second set of parameters for transmission of the third message if the UE 120 is configured to transmit the third message on a supplementary uplink carrier. In some instances, a processor 280 of the UE 120 may perform the interpreting, determining, or reading of the second message.

As shown by reference number 920, the UE 120 may transmit the third message of the RACH procedure on the supplementary uplink carrier associated with the low band. As shown, in some aspects, the UE 120 may transmit the third message at diminished transmission power. Additionally, or alternatively, the UE 120 may transmit the third message with a modified waveform. Additionally, or alternatively, the UE 120 may transmit the third message with a modified numerology. In this way, transmission performance of the UE 120 with regard to the third message may be improved. Furthermore, the specified transmission power can be adjusted for the supplementary uplink carrier, which may enable more reliable operation of the RACH procedure and/or reduce battery consumption associated with the RACH procedure.

Figure 9D:
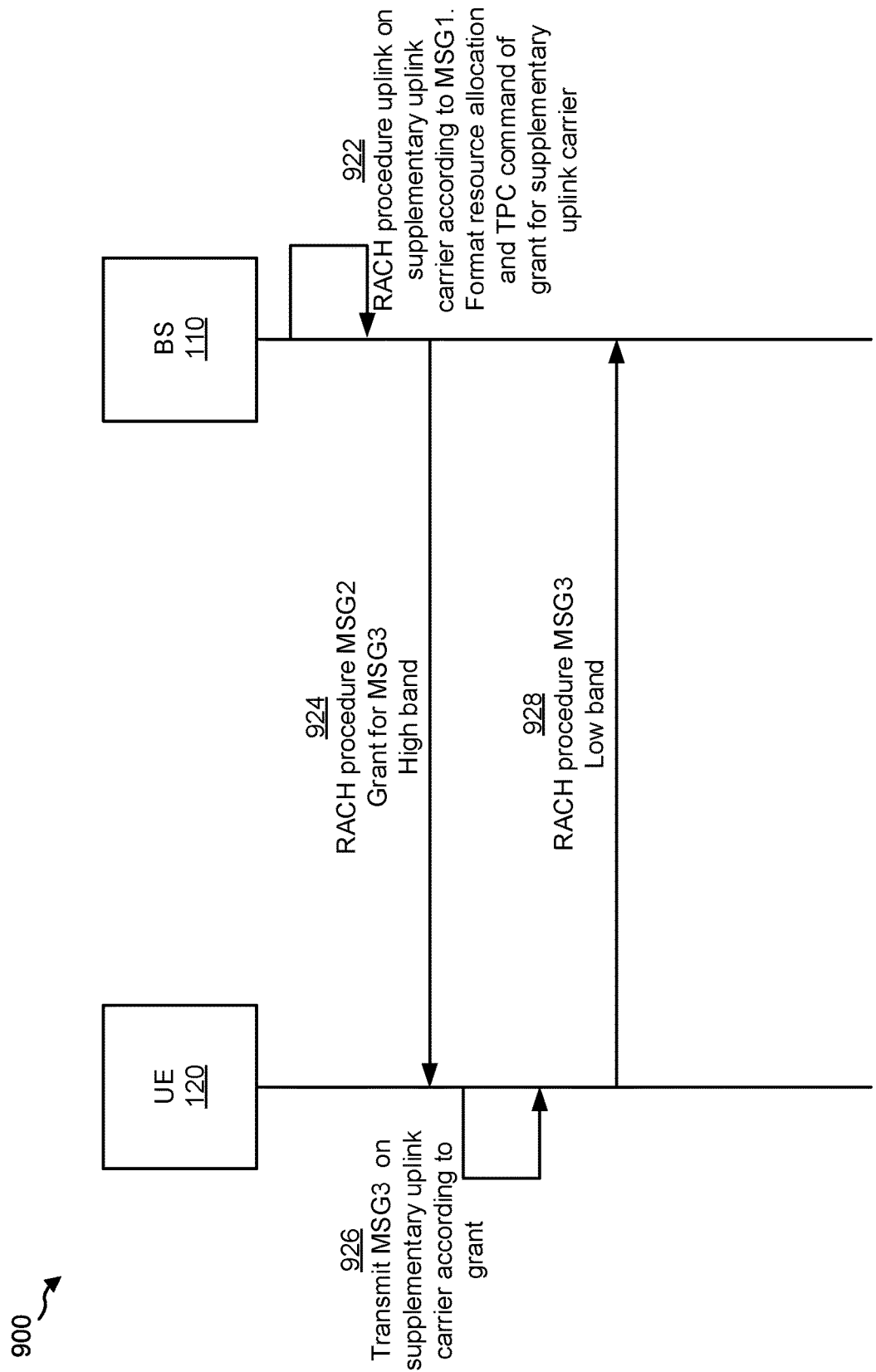

FIG. 9D shows an example of generating a grant for a third message (e.g., an RRC connection setup message) based at least in part on receiving a first message (e.g., a random access preamble) on a supplementary uplink carrier. As shown in FIG. 9D, and by reference number 922, the BS 110 may determine that the UE 120 is performing the RACH procedure using the supplementary uplink carrier (e.g., the second set of carriers) according to the first message (e.g., based at least in part on the first message being received on the second set of carriers). As further shown, the BS 110 may determine that a resource allocation and/or a TPC command of a grant (e.g., a grant provided using the second message of the RACH procedure) are to be formatted for the supplementary uplink carrier. For example, the supplementary uplink carrier may use a different resource allocation format, a different TPC command format, and/or the like than the primary uplink carrier. By using the different resource allocation format, the different TPC command format, and/or the like, the BS 110 may improve versatility of the RACH procedure and may enable performance of the RACH procedure using the supplementary uplink carrier.

In some aspects, the TPC command may have a different width for different frequency bands. For example, the TPC command may have a narrower width (e.g., 3 bits) for a frequency band associated with LTE, and may have a wider width (e.g., greater than 3 bits) for a 5G or NR band. In some aspects, the second message may exclude a channel quality indicator (CQI) request bit when the third message is to be provided on the supplementary uplink channel. For example, when the supplementary uplink channel is not associated with a paired downlink channel, a CQI may not be beneficial. Therefore, the BS 110 may omit the CQI request bit from the grant.

In some aspects, the resource allocation scheme may be different when the third message is to be provided on the supplementary uplink carrier. For example, the BS 110 may use a different subcarrier spacing, may allocate resources of a different uplink bandwidth, and/or the like.

As shown by reference number 924, the BS 110 may provide the second message of the RACH procedure (e.g., the random access response), including the grant for the third message, on a downlink carrier of the first set of carriers (e.g., associated with the higher frequency band of the UE 120). As shown by reference number 926, the UE 120 may determine to transmit the third message on the supplementary uplink carrier according to the information included in the grant, and, as shown by reference number 928, the UE 120 may transmit the third message on the supplementary uplink carrier. By transmitting the third message according to the information included in the grant, the UE 120 may improve RACH procedure performance on the supplementary uplink carrier.

Figure 9E:
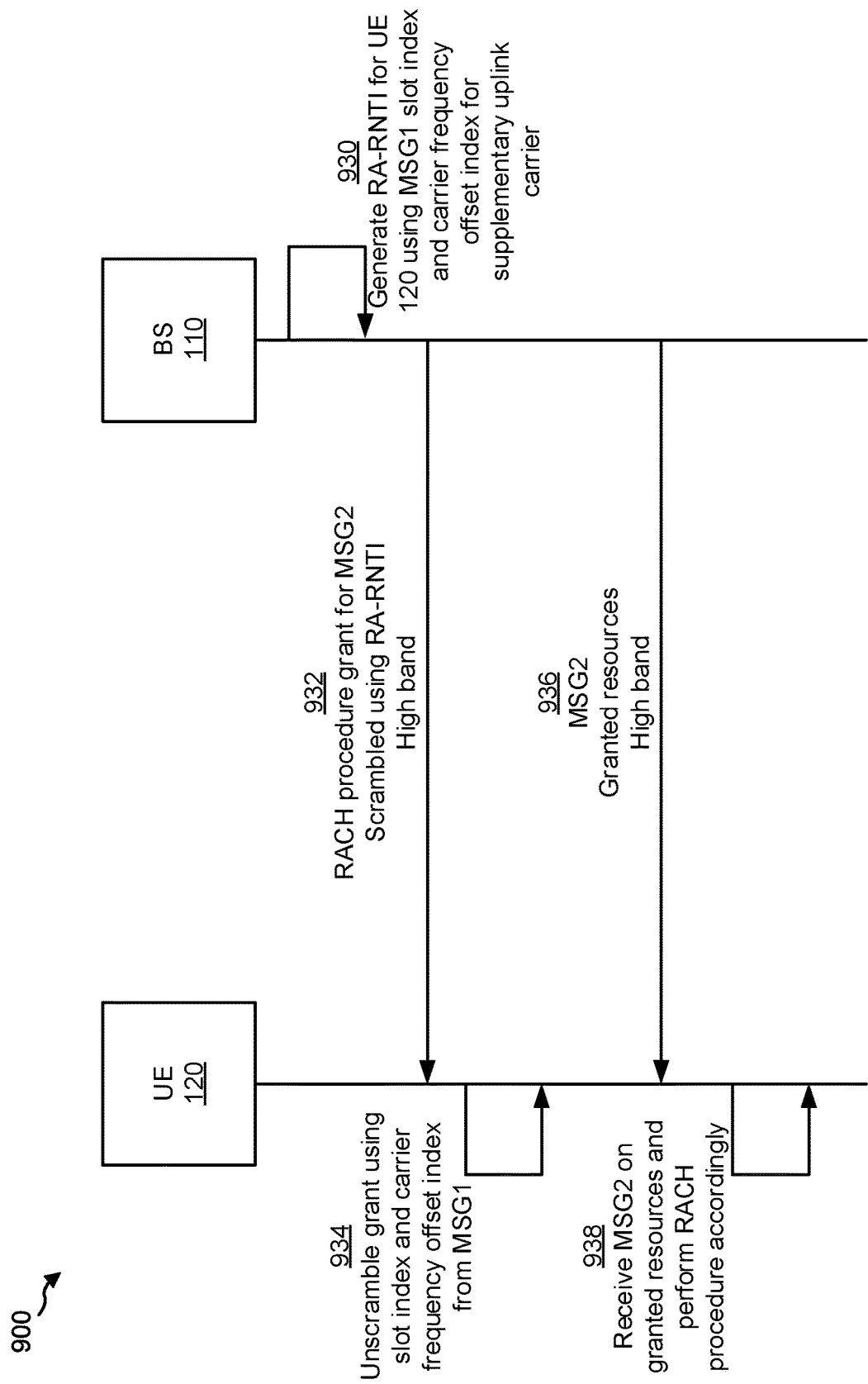

FIG. 9E is an example of generating a random access radio network temporary identifier including a carrier frequency offset index. As shown in FIG. 9E, and by reference number 930, the BS 110 may generate a random access radio network temporary identifier (RA-RNTI) for the UE 120. The BS 110 may generate the RA-RNTI using information provided by the UE 120 (e.g., a slot index for the slot on which the UE 120 provided the first message and a carrier frequency offset index for the carrier on which the UE 120 provided the first message). The RA-RNTI may be used to scramble a PDCCH grant for PDSCH resources on which to provide the second message of the RACH procedure. In some aspects, the BS 110 may generate the RA-RNTI using an uplink carrier identifier based at least in part on whether the first set of carriers or the second set of carriers is used for the RACH procedure. For example, the uplink carrier identifier may have a first value when the first set of carriers is used and may have a second value when a second set of carriers is used.

By generating the RA-RNTI using the carrier frequency offset index, provision of an RA-RNTI on a downlink carrier for a different set of carriers than the supplementary uplink carrier is enabled. For example, a traditional RA-RNTI may be generated using the slot index and not the carrier frequency offset. In such a situation, when the UE 120 receives the PDCCH with the grant for the random access response, the UE 120 may not be able to identify the uplink carrier on which the random access preamble (e.g., the first message) was provided. By generating the RA-RNTI using the carrier frequency offset index, provision of the random access response on a different set of carriers than the random access preamble is enabled.

As shown by reference number 932, the UE 120 may receive the grant for the second message (e.g., the random access response). As further shown, the grant may be scrambled using the RA-RNTI (e.g., that identifies the carrier frequency offset index), and may be received on the downlink carrier associated with the first set of carriers.

As shown by reference number 934, the UE 120 may unscramble the grant using the slot index and carrier frequency offset index from the first message (e.g., the random access preamble). For example, the UE 120 may know the slot index and the carrier frequency offset index, and may attempt to unscramble the grant using the known slot index and the carrier frequency offset index. Since unscrambling in such a case is successful, the UE 120 may determine that the granted resources are for the UE 120, and may receive the second message (e.g., the random access response) on the granted resources.

As shown by reference number 936, the BS 110 may provide the second message (e.g., the random access response) on the granted resources using the downlink carrier of the first set of carriers. As shown by reference number 938, the UE 120 may receive the second message (e.g., the random access response) on the granted resources, and may perform the RACH procedure accordingly, as described in more detail elsewhere herein. Thus, the RA-RNTI is determined based at least in part on a carrier frequency offset index, which enables provision of the random access preamble on a different carrier than the grant for the random access response.

In some aspects, the grant and/or the random access response may include information identifying the carrier on which the random access preamble was received (e.g., the supplementary uplink carrier). For example, such information may be included in a payload of the grant and/or the random access response. Thus, complexity of generating the RA-RNTI is reduced.

As indicated above, FIGS. 9A-9E are provided as examples. Other examples are possible and may differ from what was described with respect to FIGS. 9A-9E.

Figure 10:
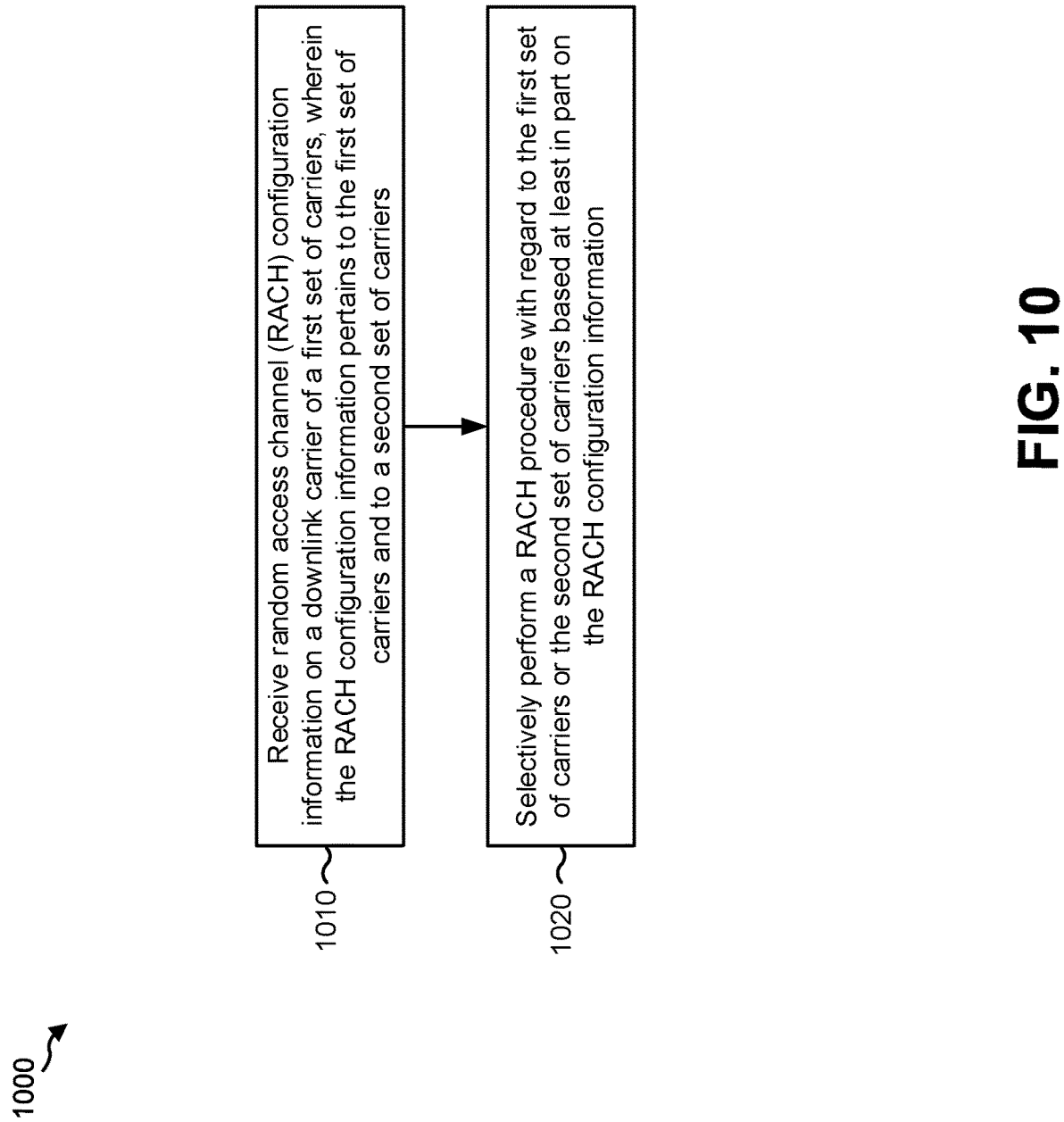
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs supplementary uplink random access configuration.

As shown in FIG. 10, in some aspects, process 1000 may include receiving random access channel (RACH) configuration information on a downlink carrier of a first set of carriers, wherein the RACH configuration information pertains to the first set of carriers and to a second set of carriers (block 1010). For example, the UE (e.g., using antenna 252, DEMOD 254, MIMO detector 256, receive processor 258, controller/processor 280, and/or the like) may receive RACH configuration information on a downlink carrier of a first set of carriers. The RACH configuration information may pertain to the first set of carriers and to a second set of carriers.

As further shown in FIG. 10, in some aspects, process 1000 may include selectively performing a RACH procedure with regard to the first set of carriers or the second set of carriers based at least in part on the RACH configuration information (block 1020). For example, the UE (e.g., using controller/processor 280 and/or the like) may selectively perform a RACH procedure with regard to the first set of carriers or the second set of carriers. When the UE performs the RACH procedure with regard to the first set of carriers, the UE may use RACH configuration information pertaining to the first set of carriers. When the UE performs the RACH procedure with regard to the second set of carriers, the UE may use RACH configuration information pertaining to the second set of carriers.

Process 1000 may include additional aspects, such as any single aspect or any combination of aspects described below and/or in connection with one or more other processes described elsewhere herein.

In some aspects, the first set of carriers is associated with a higher frequency band than the second set of carriers. In some aspects, the second set of carriers includes an uplink carrier that is a supplementary uplink carrier of the user equipment. In some aspects, the RACH configuration information is received in system information or radio resource control configuration information of the user equipment.

In some aspects, the user equipment is configured to perform the RACH procedure with regard to a particular set of carriers, of the first set of carriers and the second set of carriers, associated with a lowest frequency band supported by the user equipment. In some aspects, the RACH procedure is performed with regard to the particular set of carriers using information, of the RACH configuration information, that is pertinent to the particular set of carriers. In some aspects, the user equipment is configured to select a particular set of carriers, of the first set of carriers and the second set of carriers, to use to perform the RACH procedure based at least in part on a threshold. In some aspects, the threshold is configured to balance a load, relating to the RACH procedure, between the first set of carriers and the second set of carriers.

In some aspects, the threshold is based at least in part on a hash function performed using an identifier associated with the user equipment. In some aspects, the user equipment is configured to perform the RACH procedure with regard to a particular set of carriers, of the first set of carriers and the second set of carriers, based at least in part on a flag or value received by the user equipment and indicating to perform the RACH procedure with regard to the particular set of carriers. In some aspects, selectively performing the RACH procedure comprises retransmitting a first message of the RACH procedure on the second set of carriers based at least in part on an unsuccessful transmission of the first message on the first set of carriers. In some aspects, the first message is retransmitted on the second set of carriers based at least in part on a particular number of unsuccessful transmissions of the first message on the first set of carriers. In some aspects, a different power level is used for the retransmission than for the unsuccessful transmission. In some aspects, the different power level is based at least in part on performance of an open loop power control process for the second set of carriers. In some aspects, a same power level is used for the retransmission and for the unsuccessful transmission.

In some aspects, selectively performing the RACH procedure comprises transmitting an uplink message, based at least in part on a TPC message, using the first set of carriers or the second set of carriers, wherein the TPC message is interpreted based at least in part on whether the uplink message is transmitted using the first set of carriers or the second set of carriers.

In some aspects, selectively performing the RACH procedure comprises transmitting an uplink message, based at least in part on a TPC message, using the first set of carriers or the second set of carriers, wherein the TPC message is associated with a different number of bits based at least in part on whether the uplink message is transmitted using the first set of carriers or the second set of carriers.

In some aspects, selectively performing the RACH procedure comprises transmitting an uplink message, based at least in part on a TPC message, using the first set of carriers or the second set of carriers, wherein the uplink message is associated with a particular waveform or numerology based at least in part on whether the uplink message is transmitted using the first set of carriers or the second set of carriers.

In some aspects, selectively performing the RACH procedure comprises transmitting an uplink message, based at least in part on a TPC message, using the first set of carriers or the second set of carriers, wherein the uplink message is a third message of the RACH procedure.

In some aspects, selectively performing the RACH procedure comprises transmitting an uplink message, based at least in part on a TPC message, using the first set of carriers or the second set of carriers, wherein the uplink message is associated with a grant, wherein the grant is formatted differently based at least in part on whether the uplink message is transmitted using the first set of carriers or the second set of carriers.

In some aspects, at least one of a resource allocation, a TPC message bit width, or a channel quality information (CQI) request bit is formatted differently based at least in part on whether the uplink message is transmitted using the first set of carriers or the second set of carriers.

In some aspects, a random access radio network temporary identifier (RA-RNTI) of the user equipment is determined based at least in part on a particular set of carriers, of the first set of carriers and the second set of carriers, with regard to which the RACH procedure is performed.

In some aspects, a random access radio network temporary identifier (RA-RNTI) for a random access response (RAR) of the RACH procedure identifies a particular set of carriers, of the first set of carriers and the second set of carriers, on which the RACH procedure is performed.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   receiving random access channel (RACH) configuration information,
      wherein the RACH configuration information includes:
         a threshold associated with a first set of carriers and a second set of carriers,
         wherein the first set of carriers includes an uplink carrier that is a primary uplink carrier, and
         wherein the second set of carriers includes an uplink carrier that is a supplementary uplink carrier; and
   selectively performing a RACH procedure with regard to the first set of carriers or the second set of carriers based at least in part on the RACH configuration information.

2. The method of claim 1, wherein the first set of carriers is associated with a higher frequency band than the second set of carriers.

3. The method of claim 1, wherein the RACH configuration information is received in system information or radio resource control configuration information of the user equipment.

4. The method of claim 1, wherein the user equipment is configured to perform the RACH procedure with regard to a particular set of carriers, of the first set of carriers and the second set of carriers, associated with a lowest frequency band supported by the user equipment.

5. The method of claim 4, wherein the RACH procedure is performed with regard to the particular set of carriers using information, of the RACH configuration information, that is pertinent to the particular set of carriers.

6. The method of claim 1, wherein the user equipment is configured to select a particular set of carriers, of the first set of carriers and the second set of carriers, to use to perform the RACH procedure based at least in part on the threshold.

7. The method of claim 6, wherein the threshold is configured to balance a load, relating to the RACH procedure, between the first set of carriers and the second set of carriers.

8. The method of claim 6, wherein the threshold is based at least in part on a hash function performed using an identifier associated with the user equipment.

9. The method of claim 1, wherein the user equipment is configured to perform the RACH procedure with regard to a particular set of carriers, of the first set of carriers and the second set of carriers, based at least in part on a flag or value received by the user equipment and indicating to perform the RACH procedure with regard to the particular set of carriers.

10. The method of claim 1, wherein a random access radio network temporary identifier (RA-RNTI) of the user equipment is determined based at least in part on a particular set of carriers, of the first set of carriers and the second set of carriers, with regard to which the RACH procedure is performed.

11. The method of claim 1, wherein a random access radio network temporary identifier (RA-RNTI) for a random access response (RAR) of the RACH procedure identifies a particular set of carriers, of the first set of carriers and the second set of carriers, on which the RACH procedure is performed.

12. The method of claim 1, wherein the RACH configuration information is received on a downlink carrier of the first set of carriers.

13. A user equipment (UE) for wireless communication, comprising:
   memory; and
   one or more processors operatively coupled to the memory, the memory and the one or more processors configured to:
      receive random access channel (RACH) configuration information,
         wherein the RACH configuration information includes:
            a threshold associated with a first set of carriers and a second set of carriers,
            wherein the first set of carriers includes an uplink carrier that is a primary uplink carrier, and
            wherein the second set of carriers includes an uplink carrier that is a supplementary uplink carrier; and
      selectively perform a RACH procedure with regard to the first set of carriers or the second set of carriers based at least in part on the RACH configuration information.

14. The UE of claim 13, wherein the first set of carriers is associated with a higher frequency band than the second set of carriers.

15. The UE of claim 13, wherein the RACH configuration information is received in system information or radio resource control configuration information of the UE.

16. The UE of claim 13, wherein the UE is configured to perform the RACH procedure with regard to a particular set of carriers, of the first set of carriers and the second set of carriers, associated with a lowest frequency band supported by the UE.

17. The UE of claim 16, wherein the RACH procedure is performed with regard to the particular set of carriers using information, of the RACH configuration information, that is pertinent to the particular set of carriers.

18. The UE of claim 13, wherein the UE is configured to select a particular set of carriers, of the first set of carriers and the second set of carriers, to use to perform the RACH procedure based at least in part on the threshold.

19. The UE of claim 18, wherein the threshold is configured to balance a load, relating to the RACH procedure, between the first set of carriers and the second set of carriers.

20. The UE of claim 18, wherein the threshold is based at least in part on a hash function performed using an identifier associated with the UE.

21. The UE of claim 13, wherein the UE is configured to perform the RACH procedure with regard to a particular set of carriers, of the first set of carriers and the second set of carriers, based at least in part on a flag or value received by the UE and indicating to perform the RACH procedure with regard to the particular set of carriers.

22. The UE of claim 13, wherein a random access radio network temporary identifier (RA-RNTI) of the UE is determined based at least in part on a particular set of carriers, of the first set of carriers and the second set of carriers, with regard to which the RACH procedure is performed.

23. The UE of claim 13, wherein a random access radio network temporary identifier (RA-RNTI) for a random access response (RAR) of the RACH procedure identifies a particular set of carriers, of the first set of carriers and the second set of carriers, on which the RACH procedure is performed.

24. A non-transitory computer-readable medium storing one or more instructions for wireless communication, the one or more instructions comprising:
one or more instructions that, when executed by one or more processors of a user equipment (UE), cause the one or more processors to:
receive random access channel (RACH) configuration information,
wherein the RACH configuration information includes:
a threshold associated with a first set of carriers and a second set of carriers,
wherein the first set of carriers includes an uplink carrier that is a primary uplink carrier, and
wherein the second set of carriers includes an uplink carrier that is a supplementary uplink carrier; and
selectively perform a RACH procedure with regard to the first set of carriers or the second set of carriers based at least in part on the RACH configuration information.

25. The non-transitory computer-readable medium of claim 24, wherein the first set of carriers is associated with a higher frequency band than the second set of carriers.

26. The UE of claim 13, wherein the RACH configuration information is received on a downlink carrier of the first set of carriers.

27. The non-transitory computer-readable medium of claim 24, wherein the UE is configured to select a particular set of carriers, of the first set of carriers and the second set of carriers, to use to perform the RACH procedure based at least in part on the threshold.

28. The non-transitory computer-readable medium of claim 27, wherein the threshold is configured to balance a load, relating to the RACH procedure, between the first set of carriers and the second set of carriers.

29. The non-transitory computer-readable medium of claim 27, wherein the threshold is based at least in part on a hash function performed using an identifier associated with the UE.

30. The non-transitory computer-readable medium of claim 24, wherein a random access radio network temporary identifier (RA-RNTI) of the UE is determined based at least in part on a particular set of carriers, of the first set of carriers and the second set of carriers, with regard to which the RACH procedure is performed.

31. The non-transitory computer-readable medium of claim 24, wherein a random access radio network temporary identifier (RA-RNTI) for a random access response (RAR) of the RACH procedure identifies a particular set of carriers, of the first set of carriers and the second set of carriers, on which the RACH procedure is performed.

32. An apparatus for wireless communication, comprising:
means for receiving random access channel (RACH) configuration information,
wherein the RACH configuration information includes:
a threshold associated with a first set of carriers and a second set of carriers,
wherein the first set of carriers includes an uplink carrier that is a primary uplink carrier, and
wherein the second set of carriers includes an uplink carrier that is a supplementary uplink carrier; and
means for selectively performing a RACH procedure with regard to the first set of carriers or the second set of carriers based at least in part on the RACH configuration information.

33. The non-transitory computer-readable medium of claim 24, wherein the RACH configuration information is received on a downlink carrier of the first set of carriers.

34. The apparatus of claim 32, wherein the first set of carriers is associated with a higher frequency band than the second set of carriers.

35. The apparatus of claim 32, wherein the apparatus is configured to select a particular set of carriers, of the first set of carriers and the second set of carriers, to use to perform the RACH procedure based at least in part on the threshold.

36. The apparatus of claim 35, wherein the threshold is configured to balance a load, relating to the RACH procedure, between the first set of carriers and the second set of carriers.

37. The apparatus of claim 35, wherein the threshold is based at least in part on a hash function performed using an identifier associated with the apparatus.

38. The apparatus of claim 32, wherein a random access radio network temporary identifier (RA-RNTI) of the apparatus is determined based at least in part on a particular set of carriers, of the first set of carriers and the second set of carriers, with regard to which the RACH procedure is performed.

39. The apparatus of claim 32, wherein a random access radio network temporary identifier (RA-RNTI) for a random access response (RAR) of the RACH procedure identifies a particular set of carriers, of the first set of carriers and the second set of carriers, on which the RACH procedure is performed.

40. The apparatus of claim 32, wherein the RACH configuration information is received on a downlink carrier of the first set of carriers.

* * * * *